United States Patent [19]
Chipcase

[11] Patent Number: 5,501,320
[45] Date of Patent: Mar. 26, 1996

[54] TENSIONING ASSEMBLY FOR AN ENDLESS BELT CONVEYOR SYSTEM

[75] Inventor: Frank D. Chipcase, 116 Worcester Dr., Wayne, N.J. 07470

[73] Assignees: Frank D. Chipcase, Wayne; Joseph Lupo, Nutley, both of N.J.

[21] Appl. No.: 376,828

[22] Filed: Jan. 23, 1995

[51] Int. Cl.⁶ .................................................. B65G 23/44
[52] U.S. Cl. ..................... 198/810.04; 198/778
[58] Field of Search .................................. 198/778, 810, 198/813

[56] References Cited

U.S. PATENT DOCUMENTS

| | | | |
|---|---|---|---|
| 3,923,151 | 12/1975 | Weber | 198/813 X |
| 4,189,047 | 2/1980 | Beckius | 198/778 |
| 4,850,475 | 7/1989 | Lupo et al. | 198/778 |
| 4,866,354 | 9/1989 | Miller | 198/778 X |
| 5,191,267 | 3/1993 | Machacek | 198/778 X |
| 5,361,888 | 11/1994 | Brown et al. | 198/778 X |

FOREIGN PATENT DOCUMENTS 8702276  4/1989  Netherlands .......................... 198/778

*Primary Examiner*—James R. Bidwell
*Attorney, Agent, or Firm*—Louis E. Marn

[57] ABSTRACT

There is disclosed a conveyor system having a frame and an endless chain slidably mounted on and coiled about the frame and driven by a chain drive motor and wherein an endless belt is coursed about the frame for bearing edgewise about a predetermined length of the chain to effect circulation of the endless belt and wherein a tension drive motor removes the endless belt slack from the frame to effect such edgewise bearing and wherein the speed of the tension drive motor is continuously monitored and adjusted to maintain at a predetermined belt tension by controlling the distance between a dancer roller to a drive roller driven by the tension drive motor as measured by signals from an ultrasonic sensor representative of a predetermined target distance or differential distances between such ultrasonic sensor and the target associated with the dancer roller.

11 Claims, 2 Drawing Sheets

TENSIONING ASSEMBLY FOR AN ENDLESS BELT CONVEYOR SYSTEM

BACKGROUND OF THE INVENTION

1. Field of the Invention

This invention relates to an endless belt conveyor system and more particularly to a tensioning assembly for an endless belt conveyor system.

2. Description of the Prior Art

In U.S. Pat. No. 4,850,475 to Lupo et al., there is disclosed an endless belt conveyor system having a frame and an endless chain slidingly mounted on and coiled thereabout. The chain is comprised of a spaced plurality of linked pins driven by a sprocket drive coupled to the chain for circulation around the frame. An endless belt is coiled around the frame for bearing edgewise over a predetermined length of the chain to effect circulation of the endless belt.

The endless belt is pulled from the spiral with sufficient tension to hold the belt against the chain to minimize slippage at the belt/chain juncture as a result of positive link engagement between the drive chain and the edge of the conveyor belt. Control of tension is effected by a DC motor acting as a torque controlled output rather than a speed controlled output. Tensioning adjustment permits effective operation and cooperation between driving speeds of the endless chain and endless belt, however, requires manual and visual observations to achieve desired operating conditions. Altering product speeds by changing endless chain speed and thus endless belt tension requires concomitant visual observation coupled with manual manipulation of endless belt tensioning drive to achieve positive link engagement between the endless chain drive and edge of the endless belt.

OBJECTS OF THE INVENTION

It is an object of the present invention to provide an improved tensioning adjustment assembly for an endless belt conveyor system to provide improved on-time operation eliminating visual observations and manual adjustments.

Yet another object of the present invention is to provide an improved tensioning adjustment assembly for an endless belt conveyor system obviating inherent operational characteristics of a DC motor to alter torque output settings.

Another object of the present invention is to provide an improved tensioning adjustment assembly for an endless belt conveyor system minimizing potential belt breakage.

Still another object of the present invention is to provide an improved tensioning assembly for endless belt conveyor system for substantially instantaneous adjustment to endless belt tensioning to minimize potential build-up of hazardous endless belt tension.

A still further object of the present invention is to provide an improved belt tensioning assembly for an endless belt conveyor system eliminating manual adjustment requirements each time a speed change is made to the system.

SUMMARY OF THE INVENTION

These and other objects of the present invention are achieved in a conveyor system having a frame and an endless chain slidably mounted on and coiled about the frame and driven by a drive motor and wherein an endless belt is coursed about the frame for bearing edgewise about a predetermined length of the chain to effect circulation of the endless belt and wherein a tension drive motor removes the endless belt from the frame to effect such edgewise bearing and wherein the speed of the tension drive motor is continuously monitored and adjusted to maintain at a predetermined distance relationship between a dancer roller to a drive roller driven by the tension drive motor as measured by signals from an ultrasonic sensor representative of a predetermined target distance or differential distances between such ultrasonic sensor and the target associated with the dancer roller.

BRIEF DESCRIPTION OF THE DRAWINGS

Further objects and advantages of the present invention will become more readily apparent from the following detailed description thereof when taken in conjunction with the accompanying drawings wherein.

DETAILED DESCRIPTION OF THE INVENTION

Figure 1:
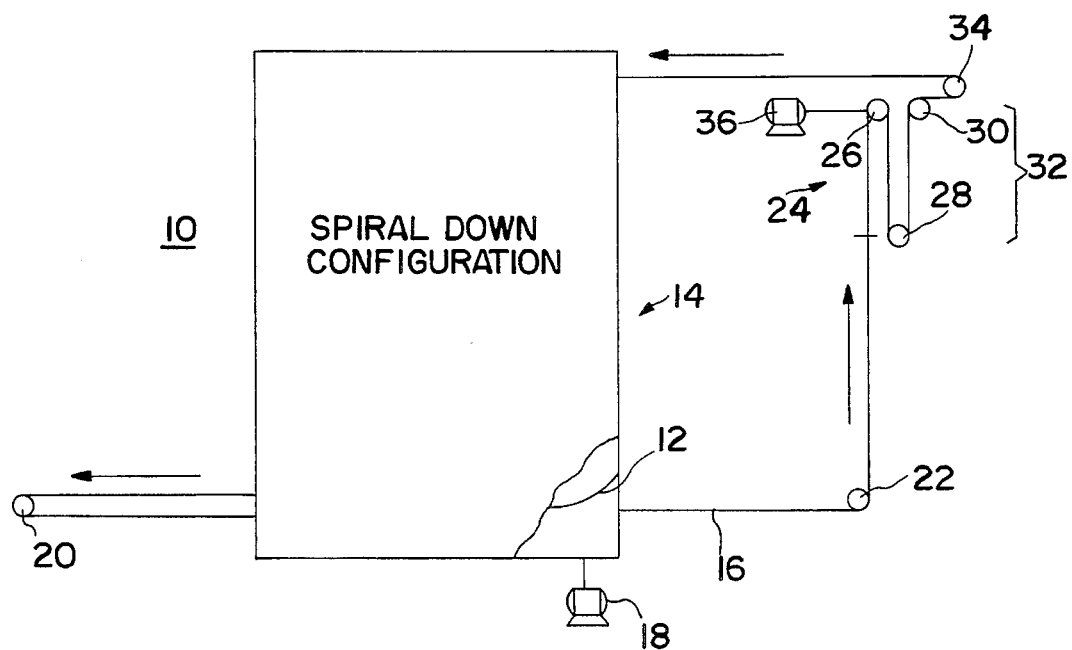
FIG. 1 is a schematic drawing of a spiral-down configuration of an endless belt conveyor system.

Referring now to the drawings and in particular FIG. 1, there is illustrated a spiral-down endless belt conveyor assembly, generally indicated as 10, such as described in U.S. Pat. No. 4,850,475 and hereby incorporated by reference, with like type of endless chain 12 slidingly mounted on and coiled about a frame, generally indicated as 14, for bearing edgewise against an endless belt 16 over a predetermined length of the endless chain 12 and driven by a drive assembly including a drive motor 18. The endless belt 16 is coursed downwardly about the frame 14 to a return roller 20 and thence upwardly about a roller 22 to a roller assembly, generally indicated as 24, comprised of a tension drive roller 26, a dancer roller 28 and a cradle roller 30 defining a bight, generally indicated as 32 cradling the dancer roller 28 for return to the frame 14 after coursing about a return roller 34. The tension drive roller 26 is driven by a tensioning belt drive motor 36 as more fully hereafter described.

Figure 3:
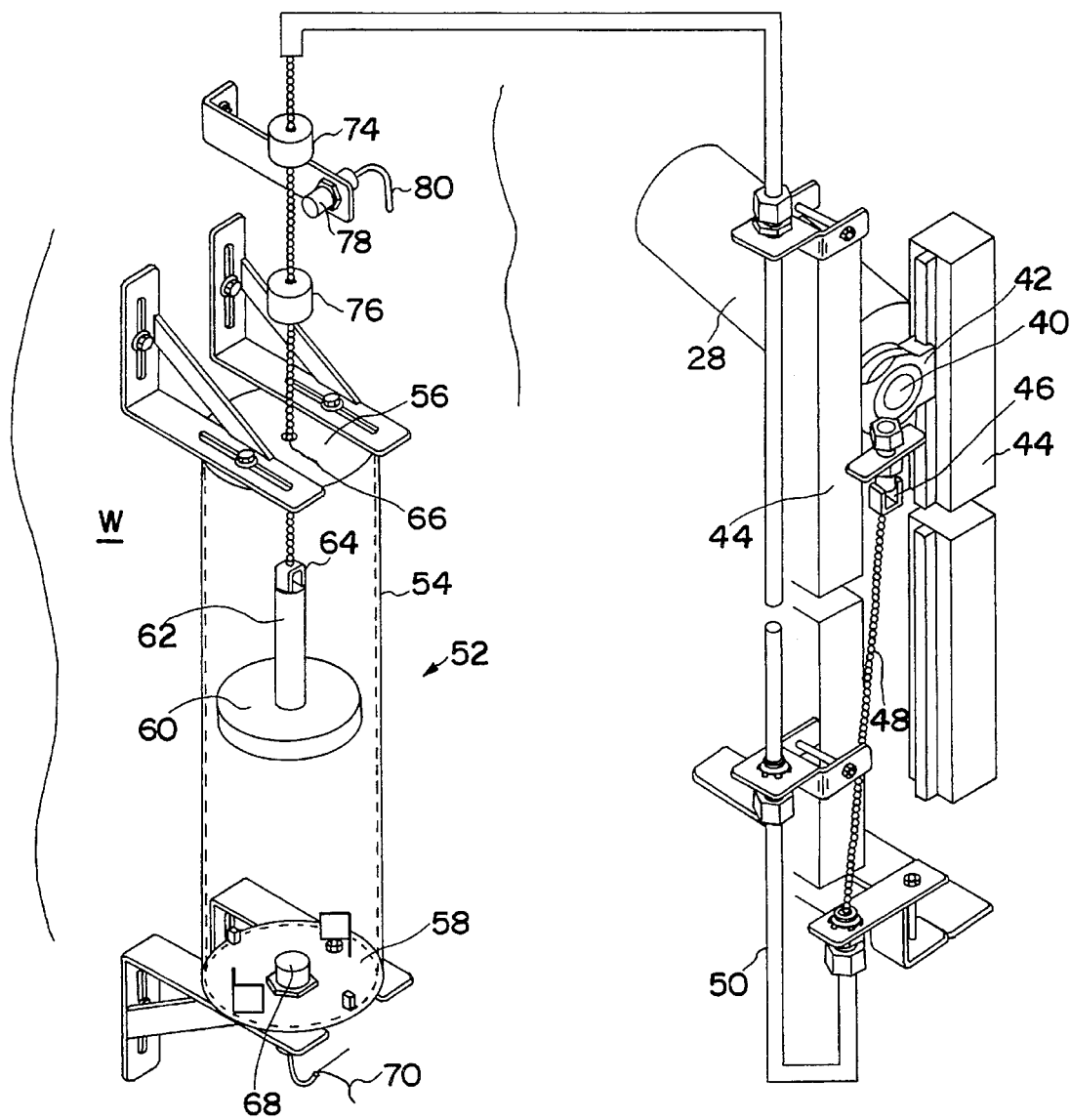
FIG. 3 is a partial isometric drawing of a remotely located tensioning sensing assembly of the present invention.
Figure 4:
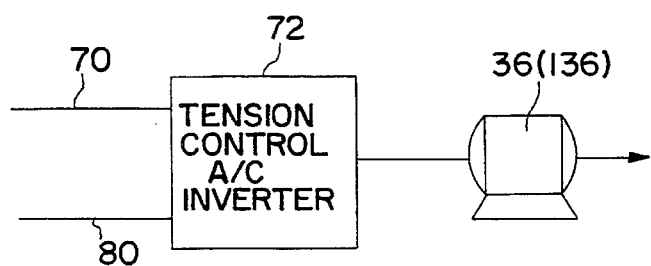
FIG. 4 is a schematic block diagram of the units responding to a signal generated by the tensioning adjusting assembly.

The dancer roller 28, referring to FIG. 3, is mounted on a shaft 40 having ends journaled in a slide member 42 (one shown) slidably mounted within dancer guides disposed between parallel support legs 44 of the frame member 14. To a slide member 42, there is mounted a U-shaped sleeve member 46 for coupling a bead 48 positioned within a conduit 50 leading to a displacement measuring assembly generally indicted as 52, mounted to a wall (W) of a container for the conveyor system, as more fully hereinafter described.

The displacement measuring assembly 52 is comprised of a transparent cylindrically-shaped housing 54 enclosed by an upper cap member 56 and a lower cap member 58. Within the housing 54, there is disposed a disc-shaped target member 60 having an upright arm member 62 mounted to a top surface portion thereof. An upper portion of the arm member 62 is provided with a U-shaped sleeve member 64 coupled to an orifice end of the bead 48 remote from the slide member 42 coursed through an orifice 66 in the upper cap member 56. The lower cap member 58 is provided with an ultrasonic transducer member 68 having a conductor 70 connected to a measuring unit 72.

As hereinabove mentioned, the housing assembly 54 may be positioned within a chamber (not shown) of the container for the endless belt conveyor assembly 10 for use in atmospheric cooling or drying applications, but outside of such a chamber for proofing or freezing applications. Remote positioning of the housing assembly 52 is required for proofing or freezing applications since ultrasonic sensors are sensitive to high relative humidity levels and low operating temperatures. Above the upper cap member 56 of the housing 54, there are mounted on the bead 48 upper and lower stop elements 74 and 76, respectively. A proximity sensor member 78 is positioned at a point midway between the stop elements 74 and 76 as more fully hereinafter described, and is connected by conductor 80 to the measuring unit 72.

Figure 2:
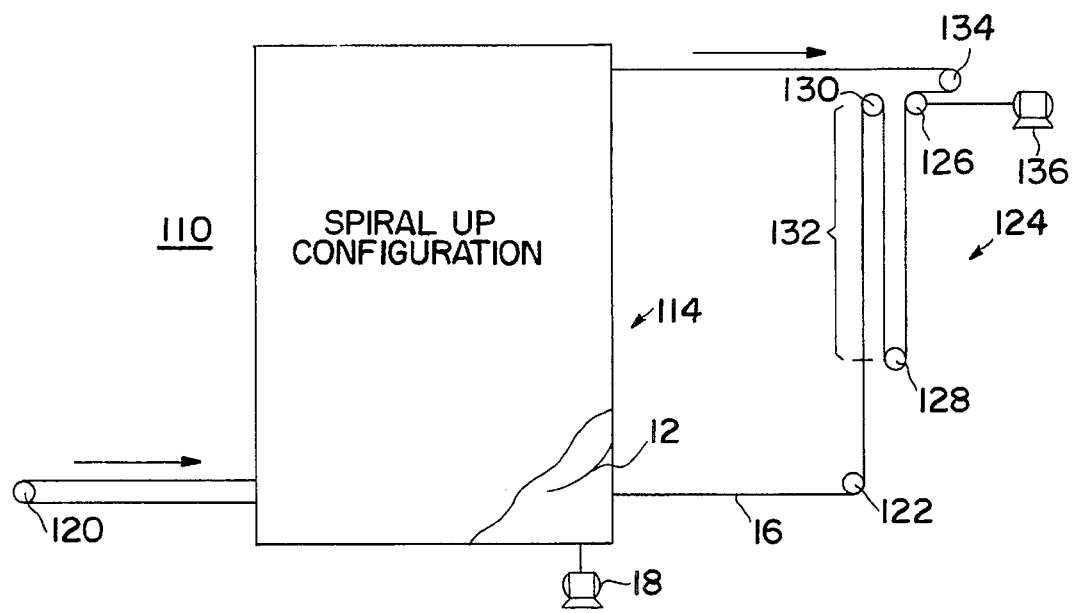
FIG. 2 is a schematic drawing of a spiral-up configuration of an endless belt conveyor system.

The spiral-up endless belt conveyor system of FIG. 2, generally indicated as 110, is similarly comprised of an endless chain 12 slidably mounted on and coiled about the frame, generally indicated as 114, for bearing edgewise against the endless belt 16 over a predetermined length of the endless chain drive by a drive motor 18. The endless belt 16 is coursed upwardly about the frame 14 to a roller member 134 and thence to a roller assembly, generally indicated as 124, comprised of a tension roller 126, a dancer roller 128 and a cradle roller 130 defining a bight, generally indicated as 132, for return to the frame via a roller 122. The endless belt 16 is coursed about a roller 120 for separate coursing into the spiral of the frame member 114. The tension roller 126 is driven by a tension belt drive motor 136.

The tension sensing assembly of FIG. 3 is similarly associated with the spiral-up conveyor system of FIG. 2.

As disclosed in the aforementioned U.S. Pat. No. 4,850, 475 describing a spiral-down conveyor system, activation of the drive motor 18 causes the endless chain 12 to course about the spiral frame without concomitant coursing of the endless belt 16. In order to effect coursing of the endless belt 16, the tension drive motor 36 must be activated to cause the endless belt 16 to be pulled from the spiral frame 14 with sufficient tension to hold the endless belt 16 against the endless chain 12 eliminating slippage at the belt/juncture. Generally, as the main drive motor 18 accelerates, the tension drive motor 36 accelerates at an equal rate until there is generated sufficient torque to effect circulation of both the endless belt 16 and endless chain 12. Adjustment to the velocity of the drive motor 18 are accompanied by manual adjustment to the velocity or speed of the endless belt 16 by the tension torque drive motor 36.

In accordance with the present invention, adjustment to the velocity of the endless motor 18 automatically result in an adjustment to the velocity of the endless belt 16 by adjusting the speed of the tension drive motor 36. Referring again to FIG. 1, illustrating a spiral-down configuration of the conveyor assembly, the sag pocket 32 defined by a difference in vertical distance between dancer roller 28 and the drive roller 26 is indicative of endless belt tensioning within the spiral track. During installation, the limit of the sag pocket 32 is set between idling and maximum speed of the endless belt 16. An equilibrium point is determined which for all speeds of the endless drive 18 vis-a-vis concomitant speeds of the tension drive motor 36 is matched whereby the endless belt 16 is being removed from the sag pocket 32 by the main spiral drive is equal to the removal of the endless belt 16 by the tension drive motor 36 from the spiral track and deposited back into the sag pocket 32.

An increase in speed of the main spiral drive 18 removes the endless belt 16 from the sag pocket 32 faster than the tension drive 36 replaces the endless belt 16 thereby causing the sag pocket or dancer roller 26 to be upwardly displaced thereby reducing tension with concomitant slippage of the endless belt 16 with respect to the endless chain 12; however, the endless belt 16 will continue to move since the tension drive motor 36 is still pulling the endless belt 16 out of the spiral at a lower relative speed and thus will reach equilibrium at a higher position of the dancer roller 28 to the drive roller 26 notwithstanding slippage.

Stoppage of the tension drive motor 36 at such a point would cause idling of the endless belt 16. However, by increasing the speed of the tension drive motor 36 to a point where there is no slippage causes the dancer roller 26 to be downwardly displaced to a point to achieve the equilibrium position whereby the amount of endless belt 16 being pulled out of the sag pocket 30 equals the amount being replaced at the higher speed of the tension drive motor 36. If the speed of the main drive motor 18 is reduced at constant tension drive speed, the dancer roller 26 is downwardly displaced, i.e., the tension drive is pulling more endless belt out of the spiral than the spiral drive is removing results in an exponential increase in belt tension and potential dangerous conditions of endless belt failure or breakage or spiral drive failure.

In accordance with the present invention, the ultrasonic sensor 68 provides a signal of the distance to the target 60 calibrated during installation to the equilibrium position of the dancer roller 28 or sag pocket 32 (±a slight adjustment factor). Consequently, once the speed of the main drive motor 18 is set, the tension drive motor 36 is caused to accelerate to a speed to achieve the equilibrium position of the dancer roller 28 and thus the precalibrated distance between the target 60 and the ultrasonic sensor 68, whereupon the tension drive motor 36 assumes the speed necessary to maintain the distance between the target 60 and the ultrasonic sensor 68 evidencing the achievement of the equilibrium state (±a small factor).

Consequently, during operation, the ultrasonic sensor 68 continuously monitors or senses distance to the target 60 for proper equilibrium position (+a variation) to ensure maintenance of the equilibrium state and an increase or decrease in speed of the tension drive motor 36 in response to a differential in distance between actual and predetermined equilibrium position of the dancer roller 28 as a function of the speed of the main drive motor 18.

With proper programming of the spiral and tension drive motor 18 and 36, respectively, after all adjustments have been effected between the target 60 and the ultrasonic sensor 68, the endless belt 16 is set to operate at a proper operating tension and the endless belt 16 running at a maximum speed, the target 60 will be stabilized between a minimum and maximum target distance. Assuming a stabilized or equilibrium position of the dancer roller 28 or sag pocket 32, once the spiral drive motor 18 begins to pull the endless belt 16 out of the sag pocket 32 (dancer roller 28 upwardly) causing the target 60 to move away from the ultrasonic sensor 68, a signal representative of such change is sent to the tension drive inverter 72 instructing the tension drive motor 36 to increase speed. When the speed of the endless drive motor 18 is set at its minimum, the dancer roller 28 (sag pocket 32) is caused to drop and the target moves towards the ultrasonic sensor 66. A signal representative of such charge is transmitted to the tension drive inverter 72 thereby generating a signal to the tension drive motor 36 to reduce speed to thereby assume a stabilized configuration.

In the spiral-up configuration of FIG. 2, the positioning of the target assembly 60 is similarly tarred or adjusted between an idling speed and a maximum speed of the spiral drive motor 18 with the equilibrium position of the target 60 being set with the concomitant required speed of the tension drive motor 136 to effect non-slippage and optimum contacting relationship therebetween. The ultrasonic sensor 68 continuously monitors distance to target 60. Should there be an increase in target distance—evidencing a reduction in tension (i.e., dancer roller 126 moves upwardly—target 60 moves upwardly), a signal is sent to the inverter sensor device 72 to accelerate the tension drive motor 136 to a higher speed whereby the target 60 moves downwardly (the dancer roller 136 downwardly) and thence to equilibrate at the predetermined equilibrium position of the target 60 from the ultrasonic sensor 68. A decrease in target distance 60 from the ultrasonic device 68 produces an opposite reaction, i.e., a deceleration to the speed of the tension drive motor 136 to cause the dancer roller 128 to be raised and consequently sensed by upward movement of the target 60 away from the ultrasonic sensor 68 until initial equilibrium position is achieved.

Elements 74 and 76 are mounted on the bead 48 to be sensed by the proximity sensor device 78 in the event of extreme operational limits of the target 60. In the event the proximity sensor 78 senses any such extreme operational limit a signal is generated and sent via conductor 80 to the A/C inverter device 72 to stop operation of the tension drive motor 36, as well as to a control unit of the drive motor 18.

While the invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A conveyor assembly, which comprises:

a frame member;

an endless chain member;

drive means for circulating said endless chain member about said frame member;

an endless belt member spirally coiled about said frame member;

a roller assembly including a belt drive roller and a dancer roller;

tension drive means for driving said belt drive roller for tensioning said endless belt member from said frame member to cause said endless belt member to come into driving contact with said endless chain member thereby to circulate said endless belt member about said frame member, distance between said dancer roller and said belt drive roller defining tensioning relationship between said endless belt member and said endless chain member;

means for sensing said tensioning relationship and providing a signal representative of a variance of said tensioning relationship from a predetermined equilibrium position of driving contact; and means for adjusting speed of said tension drive means in response to said signal.

2. The conveyor assembly as defined in claim 1 wherein said means for sensing said tensioning relationship includes a housing member, an ultrasonic sensor and a target member, said target member connected to said dancer roller and positioned within said housing member, said ultrasonic member positioned to sense said target member within said housing member.

3. The conveyor assembly as defined in claim 2 wherein said means for adjusting speed of said tension drive motor is an AC inverter connected to said ultrasonic sensor.

4. The conveyor assembly as defined in claim 1 wherein said housing member is vertically mounted to a wall of a continer for said conveyor assembly.

5. The conveyor assembly as defined in claim 4 wherein said housing member is mounted outside of said container.

6. The conveyor assembly as defined in claim 2 wherein said target member is connected by a bead to a guide member for a shaft of said dancer roller.

7. The conveyor assembly as defined in claim 6 and further including upper and lower stop members mounted on said bead chain and a proximity sensor for generating a signal to stop said tension drive means upon sensing either said upper or lower stop member.

8. The conveyor assembly as defined in claim 1 wherein said roller assembly includes a cradle roller defining a bight between said bell drive roller and said dancer roller.

9. The conveyor assembly as defined in claim 2 wherein said ultrasonic sensor continuously monitors said target member and generates a signal to accelerate said tension drive means to a higher speed should said target member move away from said ultrasonic sensor.

10. The conveyor assembly as defined in claim 2 wherein said ultrasonic sensor continuously monitors said target member and generates a signal to decelerate said tension drive means to a lower speed should said target member move towards said ultrasonic sensor.

11. The conveyor assembly as defined in claim 2 wherein said target member is adjusted to said ultrasonic sensor at a maximum speed of said drive means for said endless chain drive means with a speed of said tension drive member to permit driving contact with said endless belt member.

\* \* \* \* \*